United States Patent
Choi et al.

(10) Patent No.: US 9,602,476 B2
(45) Date of Patent: Mar. 21, 2017

(54) METHOD OF SELECTIVELY APPLYING DATA ENCRYPTION FUNCTION

(71) Applicant: ELECTRONICS AND TELECOMMUNICATIONS RESEARCH INSTITUTE, Daejeon (KR)

(72) Inventors: Jaeduck Choi, Daejeon (KR); Gunhee Lee, Daejeon (KR); Sinkyu Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 14 days.

(21) Appl. No.: 14/794,963

(22) Filed: Jul. 9, 2015

(65) Prior Publication Data

US 2016/0269368 A1    Sep. 15, 2016

(30) Foreign Application Priority Data

Mar. 13, 2015  (KR) .......................... 10-2015-0035130

(51) Int. Cl.
    *H04L 29/06*        (2006.01)
(52) U.S. Cl.
    CPC .......... *H04L 63/0428* (2013.01); *H04L 63/08* (2013.01); *H04L 63/166* (2013.01); *H04L 63/168* (2013.01)
(58) Field of Classification Search
    CPC .... H04L 63/08; H04L 63/166; H04L 63/0428
    See application file for complete search history.

(56) References Cited

U.S. PATENT DOCUMENTS

| 2012/0030739 | A1  | 2/2012 | Vadapalli et al. |
| 2014/0143855 | A1* | 5/2014 | Keoh ................ H04L 63/166 726/14 |

(Continued)

FOREIGN PATENT DOCUMENTS

| CN | 103546983 A | 1/2014 |
| KR | 10-2010-0074463 A | 7/2010 |

(Continued)

OTHER PUBLICATIONS

K. Hartke and H. Tschofenig. "A DTLS 1.2 Profile for the Internet of Things" Published Feb. 14, 2014 (20 pages) https://tools.ietf.org/pdf/draft-hartke-dice-profile-03.pdf.*

(Continued)

*Primary Examiner* — Joseph P Hirl
*Assistant Examiner* — Thomas Gyorfi
(74) *Attorney, Agent, or Firm* — LRK Patent Law Firm

(57) ABSTRACT

In a method of selectively applying a data encryption function, a CoAP client and a CoAP server perform a DTLS handshake process. The CoAP client generates a CoAP message when the DTLS handshake process has been completed, and then indicates that encryption does not need to be applied to the CoAP message. The CoAP client generates only the authentication value of the CoAP message via a DTLS record layer protocol. The CoAP client sets the value of the specific field of a DTLS record layer protocol header to a specific value via the DTLS record layer protocol. The CoAP client sends the CoAP message and the authentication value to the CoAP server.

14 Claims, 9 Drawing Sheets

(56) References Cited

U.S. PATENT DOCUMENTS

| | | | |
|---|---|---|---|
| 2014/0337614 A1* | 11/2014 | Kelson | H04L 63/168 713/152 |
| 2015/0222439 A1* | 8/2015 | Bhattacharya | H04W 4/005 713/169 |
| 2015/0281195 A1* | 10/2015 | Sharma | H04L 63/08 713/151 |

FOREIGN PATENT DOCUMENTS

| | | | |
|---|---|---|---|
| KR | 10-1452124 B1 | 10/2014 | |
| KR | 10-1465337 B1 | 11/2014 | |

OTHER PUBLICATIONS

T. Dierks. "RFC 5246: The Transport Layer Security (TLS) Protocol Version 1.2" Published Aug. 2008 (104 pages) https://tools.ietf.org/pdf/rfc5246.pdf.*

U. Blumenthal. "RFC 4785: Pre-Shared Key (PSK) Ciphersuites with NULL Encryption for Transport Layer Security" Published Jan. 2007 (5 pages) https://www.rfc-editor.org/pdfrfc/rfc4785.txt.pdf.*

E. Rescorla et al., "Datagram Transport Layer Security Version 1.2," Internet Engineering Task Force (IETF), Jan. 2012.

Z. Shelby et al., "The Constrained Application Protocol (CoAP)," Internet Engineering Task Force (IETF), Jun. 2014.

H. Tschofenig, "A Datagram Transport Layer Security (DTLS) 1.2 Profile for the Internet of Things," Internet-Draft (draft-ietf-dice-profile-05.txt) of IETF, Oct. 2014.

* cited by examiner

METHOD OF SELECTIVELY APPLYING DATA ENCRYPTION FUNCTION

CROSS-REFERENCE TO RELATED APPLICATION

This application claims the benefit of Korean Patent Application No. 10-2015-0035130, filed Mar. 13, 2015, which is hereby incorporated by reference herein in its entirety.

BACKGROUND

1. Technical Field

Embodiments of the present invention relate to a method of selectively applying a data encryption function and, more particularly, to a method that is capable of selectively applying application data encryption in a datagram transport layer security (DTLS) record layer.

2. Description of the Related Art

The IETF standard organization has standardized the Constrained Application Protocol (CoAP) that can be used in the Internet of Things (IoT). The CoAP replaces the Transmission Control Protocol (TCP)-based Hypertext Transfer Protocol (HTTP), and is a protocol that operates based on the user datagram protocol (UDP).

The CoAP standard document stipulates the use of DTLS in order to protect a CoAP message, and prescribes that the encryption algorithm standard "TLS_PSK_WITH_AES_128_CCM_8" providing both data integrity and confidentiality must be used when DTLS is used.

In an IoT environment, all the CoAP messages are provided with data integrity (authentication) and confidentiality (encryption) through the DLTS encryption algorithm standard AES_CCM after a DTLS security channel is set up.

In an IoT environment, devices have many limitations on using resources, such as memory capacity and the operation capability of a CPU. Accordingly, the IETF has standardized the UDP-based CoAP in order to apply a TCP-based HTTP protocol to IoT devices. Messages, such as a message indicating the turning on/off of a light at customer premises or in a building, can be transferred using the CoAP.

DTLS is a standardized TCP-based TLS security protocol, and provides authentication, data integrity and confidentiality. DTLS is a security protocol standardized by reinforcing procedures, such as the retransmission of a TLS message, in order to ensure reliability in an unreliable UDP environment.

The DTLS encryption algorithm standard is defined in the form of TLS_PSK_WITH_AES_128_CCM_8, and accommodates most of the encryption algorithm standards of TLS. A pre-shared key (PSK) refers to performing authentication using a previously defined secret key. AES_128_CCM_8 refers to providing data integrity and confidentiality in accordance with the AES_CCM method using a 128-bit symmetric key. The number "8" of TLS_PSK_WITH_AES_128_CCM_8 means that 8 bytes are used as an authentication value. For reference, TLS_RSA_WITH_AES_128_CBC_SHA256 means that authentication is performed using an RSA public key encryption algorithm, data encryption is provided in AES_CBC mode using a 128-bit symmetric key, and data integrity is provided using SHA256.

In DTLS, processes, such as the negotiation of a DTLS encryption algorithm standard, the exchange of authentication certificates and the exchange of symmetric keys, are performed via a DTLS handshake protocol process between two nodes. Once the DTLS handshake protocol process has been terminated, the two nodes provide data integrity and confidentiality functions in accordance with an encryption algorithm standard negotiated via the DTLS record layer protocol. For example, if two CoAP nodes have negotiated TLS_PSK_WITH_AES_128_CCM_8 as an encryption algorithm standard in a DTLS handshake protocol process, they provide data integrity and confidentiality in accordance with AES_128_CCM_8 in a DTLS record layer protocol.

FIG. 1 is a diagram illustrating the structure of TLS to help understanding of DTLS.

The structure of TLS is the same as that of DTLS except some pieces of header information. A DTLS handshake process includes a handshake protocol and a change cipher spec protocol, as illustrated in FIG. 1.

Once security negotiations have been terminated in the DTLS handshake process, actual application data is generated in an application layer and is delivered to a record layer protocol, so that data integrity and confidentiality are provided. Furthermore, DTLS data is finally included in a UDP payload and is then delivered.

FIG. 2 is a diagram illustrating a DTLS handshake process to help understanding of DTLS. A DTLS handshake process is started by starting the transmission of a ClientHello message. The DLTS handshake process is terminated by sending a Finished message to a server side.

In FIG. 2, the integrity and confidentiality of application data are provided to Application Data. That is, the part of which the record layer protocol of FIG. 1 takes charge is the Application Data part of FIG. 2.

However, both data integrity and confidentiality do not need to be provided to all the CoAP messages. For example, if all the lights of a building or a home are simultaneously turned on or off, a clue to determining whether a resident is present in the building or home may be provided to a malicious attacker who tries to intrude into the building or home. However, the eavesdropping of a CoAP message indicative of the turning on or off of some lights may be meaningless for a malicious attacker. Furthermore, in a CoAP group communication environment, even simple ACK messages received from a plurality of devices may not be useful for an attacker. It is also necessary to reduce resources consumed by continuously performing an encryption process on resource-restricted IoT devices.

Furthermore, the load of memory attributable to the installation of the DLTS encryption algorithm standard on IoT devices needs to be taken into consideration. The DTLS encryption algorithm standard also includes the standard "TLS_PSK_WITH_NULL_SHA256" that provides only data integrity. If the standard providing only data integrity is installed on an IoT device, however, there is the burden of additionally installing an SHA256 encryption module on the IoT device. That is, CoAP-based IoT devices have the burden of installing both the encryption algorithm standard "TLS_PSK_WITH_AES_128_CCM_8" and the standard "TLS_PSK_WITH_NULL_SHA256."

In the selective application of confidentiality to a CoAP message, there is also a resource waste problem attributable to the frequent re-establishment of DTLS sessions. For example, in order to deliver a CoAP message that needs to be encrypted, CoAP nodes may set a DTLS session to "TLS-PSK-WITH-AES-128-CCM-8." Furthermore, a CoAP client may generate the authentication tag value of the CoAP message in the DTLS record layer, may encrypt plaintext and the authentication tag value, and may deliver the encrypted plaintext and authentication tag value to a CoAP server. If a CoAP node has to deliver a CoAP message that does not need to be encrypted, CoAP nodes may release a current DTLS session, and may set the DTLS session to "TLS-PSK-WITH-NULL-SHA256" again. In other words, due to an unpredicted IoT service scenario characteristic (e.g., the characteristic in which the level of sensitivity of data leakage differs), CoAP nodes may have to frequently set up DTLS sessions again in accordance with the encryption algorithm standard that provides both data integrity and confidentiality and the encryption algorithm standard that provides only data integrity. This becomes a primary cause of the waste of resources in the application of DTLS to the CoAP nodes.

Conventional arts provide only a method of providing both data integrity and confidentiality, such as TLS-PSK-WITH-AES-128-CCM-8, in the application of DTLS to the CoAP. Accordingly, the resources of IoT devices are not efficiently used because an encryption process needs to be performed on even a CoAP message that does not need to be encrypted.

An art related to the present invention includes a technology disclosed in Korean Patent Application Publication No. 2010-0074463 entitled "Method for Securing Media Independent Handover Message Transportation."

SUMMARY

At least one embodiment of the present invention is directed to the provision of a method of selectively applying a data encryption function, which, when devices use DTLS, enables the resources of the devices to be efficiently used by selectively applying encryption to data in a DTLS record layer protocol stage that provides data integrity and encryption.

In accordance with an aspect of the present invention, there is provided a method of selectively applying a data encryption function, including: performing, by a CoAP client and a CoAP server, a DTLS handshake process; generating, by the CoAP client, a CoAP message when the DTLS handshake process has been completed, and then indicating, by the CoAP client, that encryption does not need to be applied to the CoAP message; generating, by the CoAP client, only the authentication value of the CoAP message via a DTLS record layer protocol; setting, by the CoAP client, the value of the specific field of a DTLS record layer protocol header to a specific value via the DTLS record layer protocol; and sending, by the CoAP client, the CoAP message and the authentication value to the CoAP server.

Performing the DTLS handshake process may include performing the DTLS handshake process in accordance with an encryption algorithm standard that provides both data integrity and confidentiality.

Indicating that the encryption is not applied to the CoAP message may include setting the value of a lowest 1 bit of a CoAP option field to 0.

Indicating that the encryption is not applied to the CoAP message may include: newly defining an Encryption Option in a CoAP; and setting the right lowest 1 bit of the option value region of a CoAP format to 0.

The specific field of the DTLS record layer protocol header may include an epoch field.

Setting the value of the specific field of the DTLS record layer protocol header to the specific value may include setting the left highest 1 bit of the epoch field to 0.

The method may further include: checking, by the CoAP server, the value of the specific field of the DTLS record layer protocol header after sending the CoAP message and the authentication value to the CoAP server; and verifying, by the CoAP server, only the authentication value of the CoAP message if, as a result of the checking, the value of the specific field is found to be the specific value.

Checking the value of the specific field of the DTLS record layer protocol header may include checking the value of the left highest 1 bit of the epoch field of the DTLS record layer protocol header.

Verifying only the authentication value of the CoAP message if, as a result of the checking, the value of the specific field is found to be the specific value may include verifying only the authentication value of the CoAP message if the value of the left highest 1 bit of the epoch field of the DTLS record layer protocol header is 0.

In accordance with another aspect of the present invention, there is provided a method of selectively applying a data encryption function, including: performing, by a CoAP client and a CoAP server, a DTLS handshake process; generating, by the CoAP client, a CoAP message when the DTLS handshake process has been completed, and then indicating, by the CoAP client, that encryption needs to be applied to the CoAP message; generating, by the CoAP client, the authentication value of the CoAP message, and performing, by the CoAP client, encryption via a DTLS record layer protocol; setting, by the CoAP client, the value of the specific field of a DTLS record layer protocol header to a specific value via the DTLS record layer protocol; and sending, by the CoAP client, the encrypted CoAP message and the authentication value to the CoAP server.

Performing the DTLS handshake process may include performing the DTLS handshake process in accordance with an encryption algorithm standard that provides both data integrity and confidentiality.

Indicating that the encryption needs to be applied to the CoAP message may include setting the value of the lowest 1 bit of a CoAP option field to 1.

Indicating that the encryption needs to be applied to the CoAP message may include: newly defining an Encryption Option in a CoAP; and setting a right lowest 1 bit of an option value region of a CoAP format to 1.

The specific field of the DTLS record layer protocol header may include an epoch field.

Setting the value of the specific field of the DTLS record layer protocol header to the specific value may include setting the left highest 1 bit of the epoch field to 1.

The method may further include, after sending the encrypted CoAP message and the authentication value to the CoAP server: checking, by the CoAP server, the value of the specific field of the DTLS record layer protocol header; and decoding, by the CoAP server, the encrypted CoAP message, and then verifying, by the CoAP server, the authentication value if, as a result of the checking, the value of the specific field is found to be the specific value.

Checking the value of the specific field of the DTLS record layer protocol header may include checking the left value of the highest 1 bit of the epoch field of the DTLS record layer protocol header.

Decoding the encrypted CoAP message and verifying the authentication value if, as a result of the checking, the value of the specific field is found to be the specific value may include decoding the encrypted CoAP message and also verifying the authentication value if the value of the left highest 1 bit of the epoch field of the DTLS record layer protocol header is 1.

In accordance with still another aspect of the present invention, there is provided a method of selectively applying a data encryption function, including: performing, by a CoAP client and a CoAP server, a DTLS handshake process in accordance with an encryption algorithm standard that provide both data integrity and confidentiality; and selectively applying, by the CoAP client, encryption to data via a DTLS record layer protocol that provides data integrity and confidentiality, and then sending, by the CoAP client, the encrypted data to the CoAP server.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION

Figure 1:
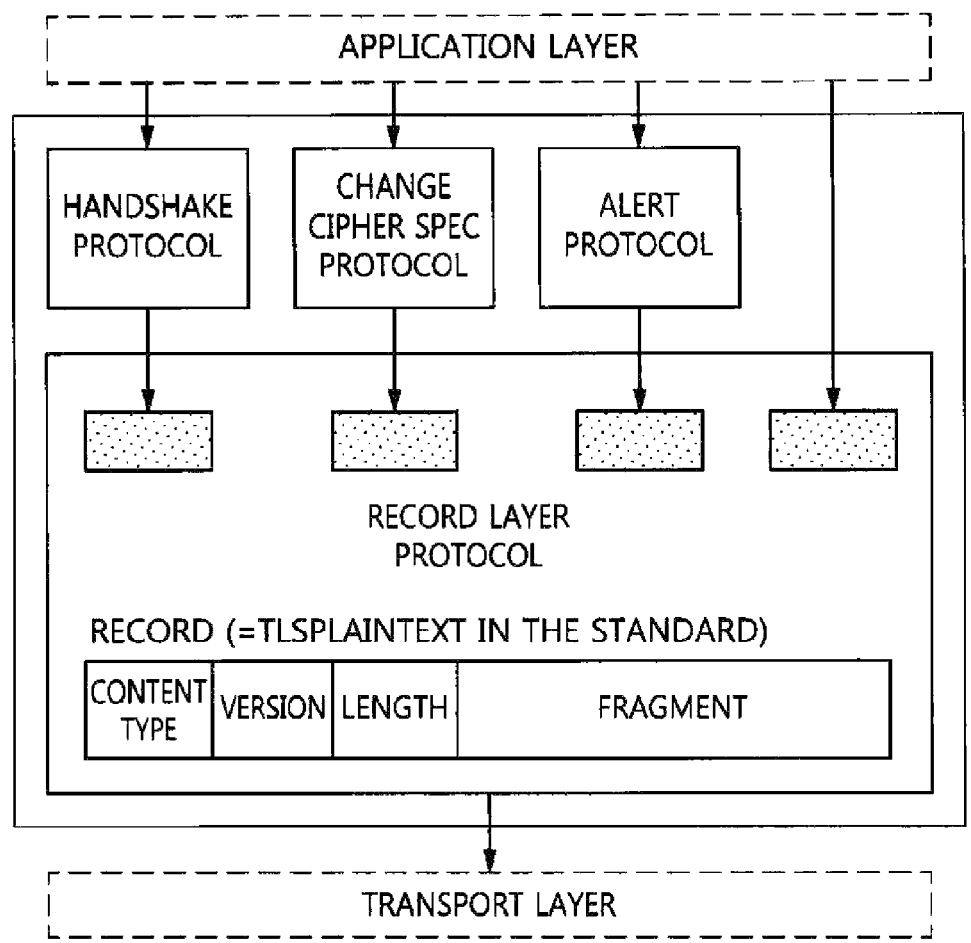
FIG. 1 is a diagram illustrating the structure of TLS to help understanding of DTLS.
Figure 2:
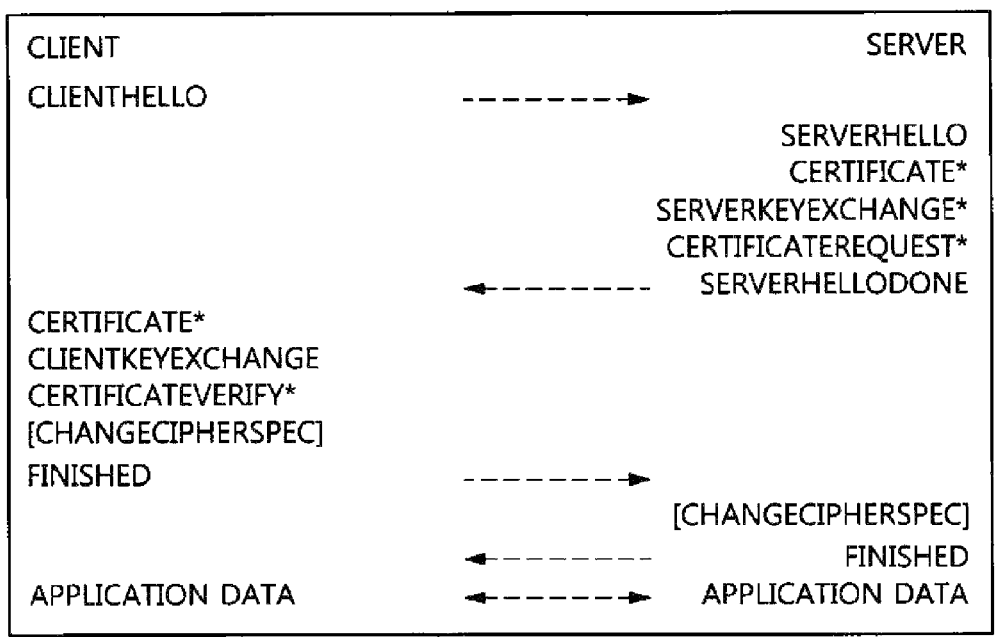
FIG. 2 is a diagram illustrating a DTLS handshake process to help understanding of DTLS.

Existing DTLS is an encryption algorithm standard that provides only data integrity in a DTLS handshake process. In such DTLS, DTLS nodes perform a security negotiation, and only a data integrity function is provided in a DTLS record layer protocol stage. In contrast, in the encryption algorithm standard that provides both data integrity and confidentiality in a DTLS handshake process, DTLS nodes perform a security negotiation, and both data integrity and confidentiality are provided in a DTLS record layer protocol stage.

That is, in the existing DTLS, whether only data integrity or both data integrity and confidentiality will be provided is determined in the DTLS handshake process.

In contrast, in accordance with an encryption algorithm standard according to embodiments of the present invention to be described, both data integrity and confidentiality are provided in the DTLS handshake process, a DTLS security negotiation is performed, and data confidentiality is selectively applied in the DTLS record layer protocol stage. For this purpose, DTLS nodes need to be aware whether data has been encrypted based on DTLS record layer header information. For this, part of a DTLS record layer header field is defined and used as bits for identifying whether encryption has been applied. Furthermore, a DTLS record layer needs to be aware which CoAP message needs to encrypted. For this purpose, a CoAP option field is defined in order to identify whether encryption has been applied to a CoAP message.

In other words, in embodiments of the present invention, when a CoAP message is generated, information about whether encryption has been applied is set in the CoAP option field. A DTLS record layer that has received the CoAP message determines whether DTLS encryption has been applied based on the information about whether encryption has been applied, which is set in the option field of the CoAP message. Furthermore, a CoAP node that has received the CoAP message over a DTLS security channel determines whether encryption has been applied based on DTLS record header information in the DTLS record layer, and then performs a corresponding procedure.

The present invention may be subjected to various modifications and have various embodiments. Specific embodiments are illustrated in the drawings and described in detail below.

However, it should be understood that the present invention is not intended to be limited to these specific embodiments but is intended to encompass all modifications, equivalents and substitutions that fall within the technical spirit and scope of the present invention.

The terms used herein are used merely to describe embodiments, and not to limit the inventive concept. A singular form may include a plural form, unless otherwise defined. The terms, including "comprise," "includes," "comprising," "including" and their derivatives specify the presence of described shapes, numbers, steps, operations, elements, parts, and/or groups thereof, and do not exclude presence or addition of at least one other shapes, numbers, steps, operations, elements, parts, and/or groups thereof.

Unless otherwise defined herein, all terms including technical or scientific terms used herein have the same meanings as commonly understood by those skilled in the art to which the present invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein.

Embodiments of the present invention are described in greater detail below with reference to the accompanying drawings. In order to facilitate the general understanding of the present invention, like reference numerals are assigned to like components throughout the drawings and redundant descriptions of the like components are omitted.

Figure 3:
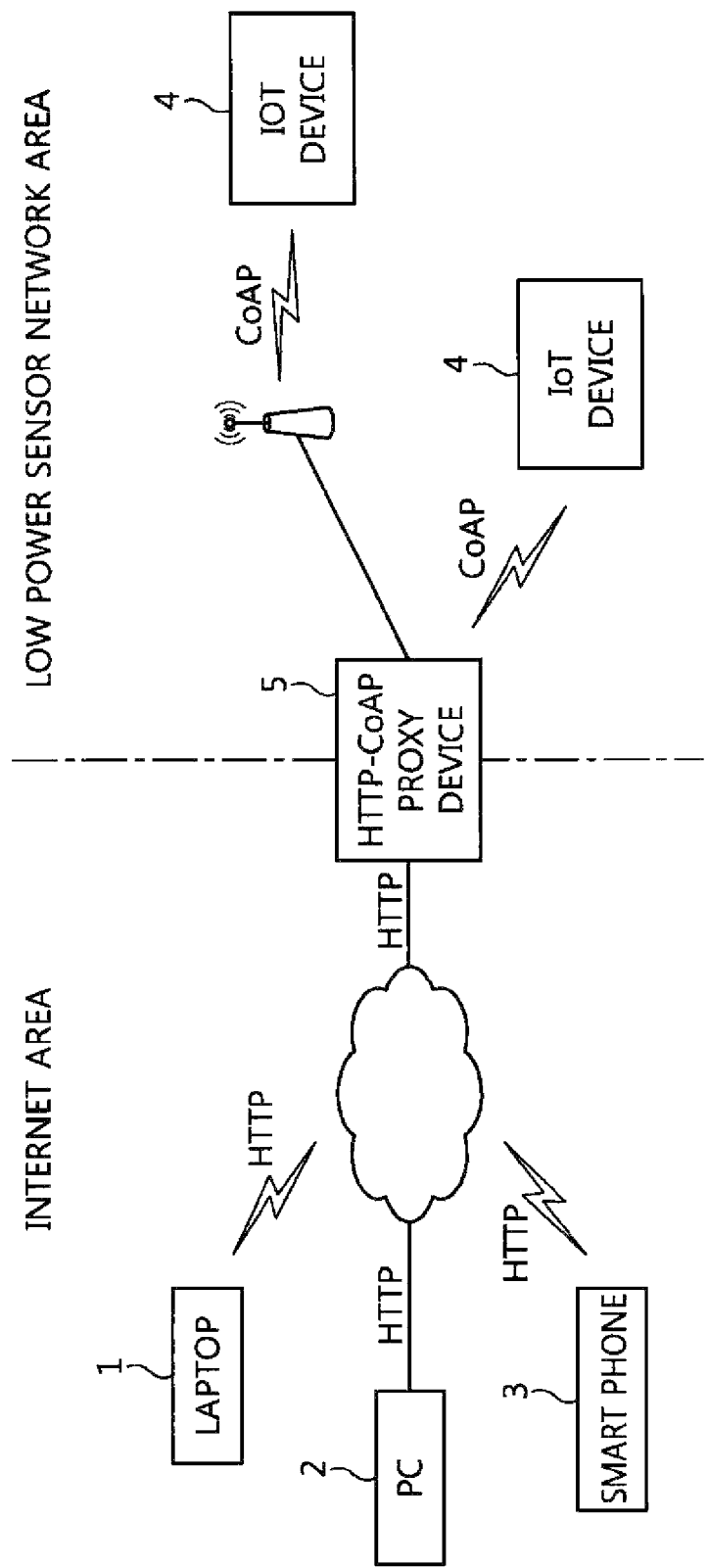
FIG. 3 is a diagram illustrating the configuration of the IoT based on the CoAP to which at least one embodiment of the present invention is applied.

FIG. 3 is a diagram illustrating the configuration of the IoT based on the CoAP to which at least one embodiment of the present invention is applied.

In an existing Internet region (i.e., a part on the left side of FIG. 3), application data is delivered using the HTTP protocol.

An IoT environment (i.e., a part on the right side of FIG. 3, a low-power sensor network area) includes devices (i.e., IoT devices (e.g., smart home appliances) 4) having small resource specifications, such as low power and low memory capacity. The CoAP has been standardized by the IETF standard organization in order to efficiently use the resources of devices having low specification in the IoT environment (i.e., the low-power sensor network area).

The CoAP may be considered to be a standard that allows the TCP-based HTTP to operate based on the UDP. In the IoT environment (i.e., the low-power sensor network area), control functions, such as the monitoring of the amounts of power usage of the customer-premises smart home appliances 4 and the turning on/off thereof, can be performed using a notebook 1, a personal computer (PC) 2 or a smart phone 3 at a remote location over the Internet. In order to implement such services, an HTTP-CoAP proxy device 5 may be placed at customer premises. The HTTP-CoAP proxy device 5 functions to convert protocols between the HTTP and the CoAP.

In the present invention, the DTLS encryption algorithm standard is not limited to "TLS-PSK-WITH-AES-128-CCM-8," and includes all the encryption algorithm standards that provide both data integrity and confidentiality. The performance of a DTLS handshake process using an encryption algorithm standard that provides only a data integrity function is not included in the present invention.

For reference, the encryption algorithm standard that provides both data integrity and confidentiality may include "TLS_PSK_WITH_AES_128_CBC_SHA256," "TLS_RSA_WITH_AES_128_CBC_SHA256," and "TLS_DH_DSS_WITH_AES_128_CBC_SHA256."

Meanwhile, the encryption algorithm standard that provides only data integrity may include "TLS_PSK_WITH_NULL_SHA256," and "TLS_RSA_WITH_NULL_SHA256."

Figure 4:
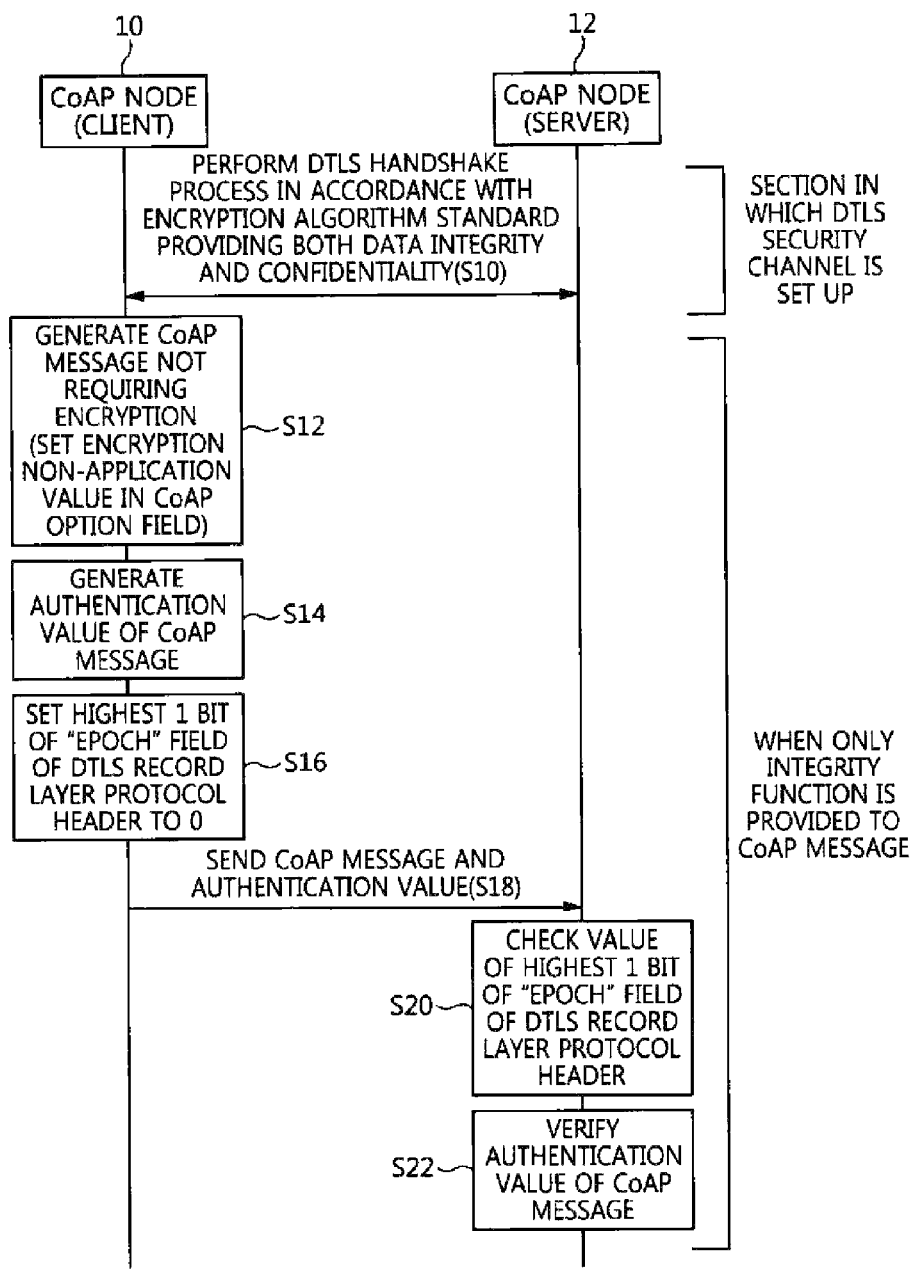
FIG. 4 is a flowchart illustrating a method of selectively applying a data encryption function according to a first embodiment of the present invention.
Figure 5:
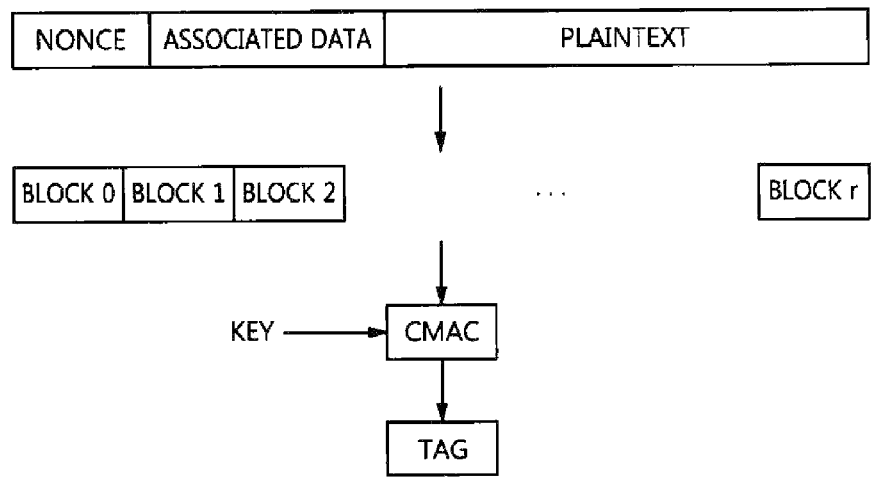
FIG. 5 is a diagram illustrating a process of generating an authentication value in the AES_CCM that is employed in the description of FIG. 4.
Figure 6:
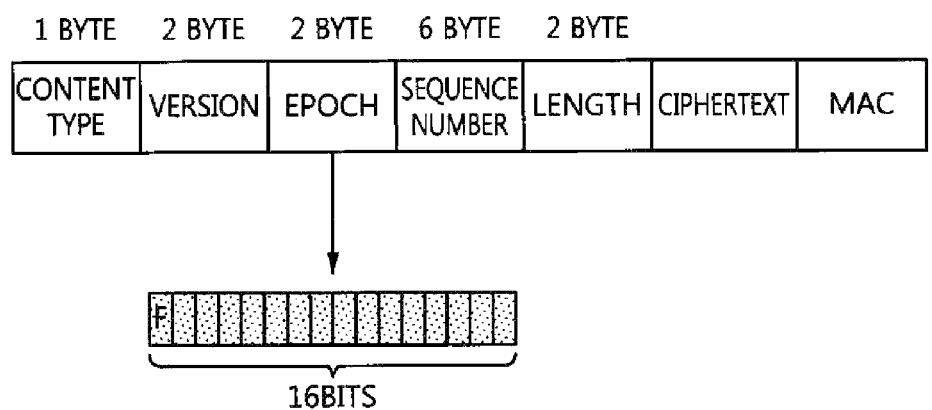
FIG. 6 is a diagram illustrating the configuration of a DTLS record layer protocol header that is employed in the description of FIG. 4.

FIG. 4 is a flowchart illustrating a method of selectively applying a data encryption function according to a first embodiment of the present invention, FIG. 5 is a diagram illustrating a process of generating an authentication value in the AES_CCM that is employed in the description of FIG. 4, and FIG. 6 is a diagram illustrating the configuration of a DTLS record layer protocol header that is employed in the description of FIG. 4.

A case where only an integrity function is provided to a CoAP message is described in the following description of the first embodiment of the present invention.

First, CoAP nodes 10 and 12 perform a DTLS handshake process using "TLS-PSK-WITH-AES-128-CCM-8," i.e., the basic DTLS encryption algorithm standard of the CoAP, in order to protect a CoAP message at step S10. Hereinafter, the CoAP node 10 is referred to as a "CoAP client," and the CoAP node 12 is referred to as a "CoAP server."

As described above, once the DTLS handshake process has been terminated, the CoAP client 10 and the CoAP server 12 have been prepared for the exchange of CoAP messages. That is, a DTLS security channel is set up between the CoAP client 10 and the CoAP server 12.

Thereafter, in the first embodiment of the present invention, since only an integrity function is provided to a CoAP message, the CoAP client 10 generates a CoAP message and sets the value of the lowest 1 bit of a CoAP option field to "0" indicating that encryption should not be applied to the CoAP message at step S12. The setting of the value of the lowest 1 bit of the CoAP option field to "0" will be described in greater detail below (see FIG. 9C).

Furthermore, the CoAP client 10 generates only the authentication value (the message authentication code (MAC)) of the CoAP message via a DTLS record layer protocol at step S14. For example, in the case of the AES_CCM encryption algorithm standard, only a process of generating an authentication value, such as that of FIG. 5, is performed. For example, in the case of AES_128_CBC_SHA256, only an authentication value is generated using SHA256.

Thereafter, the CoAP client 10 sets the left highest 1 bit of the 2-byte "Epoch" field F of a DTLS record layer protocol header (see FIG. 6) to 0 via the DTLS record layer protocol at step S16.

Thereafter, the CoAP client 10 sends the CoAP message and the authentication value to the CoAP server 12 at step S18.

Accordingly, the CoAP server 12 checks the value of the left highest 1 bit of the 2-byte "Epoch" field F of the DTLS record layer protocol header at step S20.

If, as a result of the checking, the value is found to be "0," the CoAP server 12 verifies only the authentication value of the CoAP message at step S22.

Figure 7:
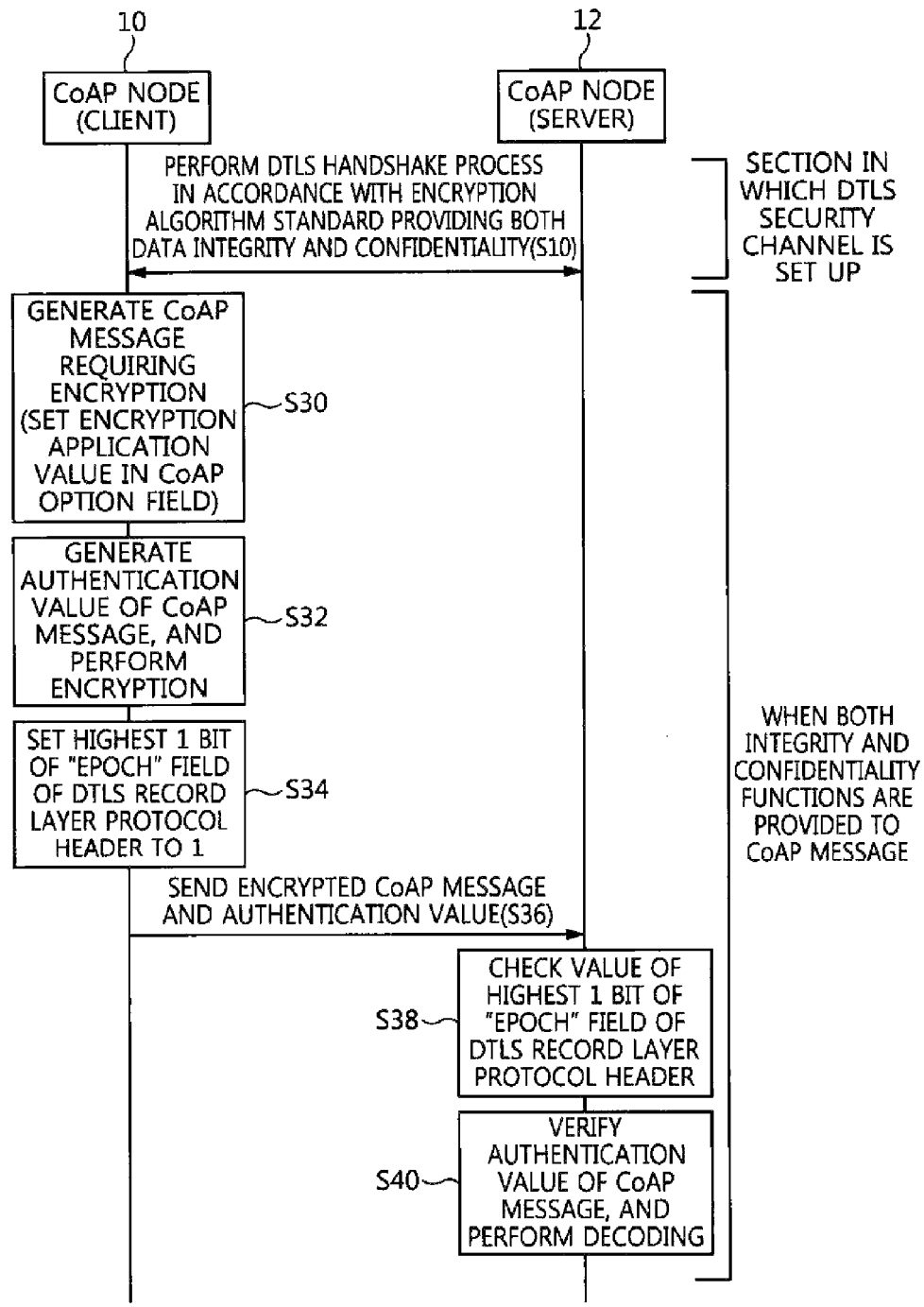
FIG. 7 is a flowchart illustrating a method of selectively applying a data encryption function according to a second embodiment of the present invention.
Figure 8:
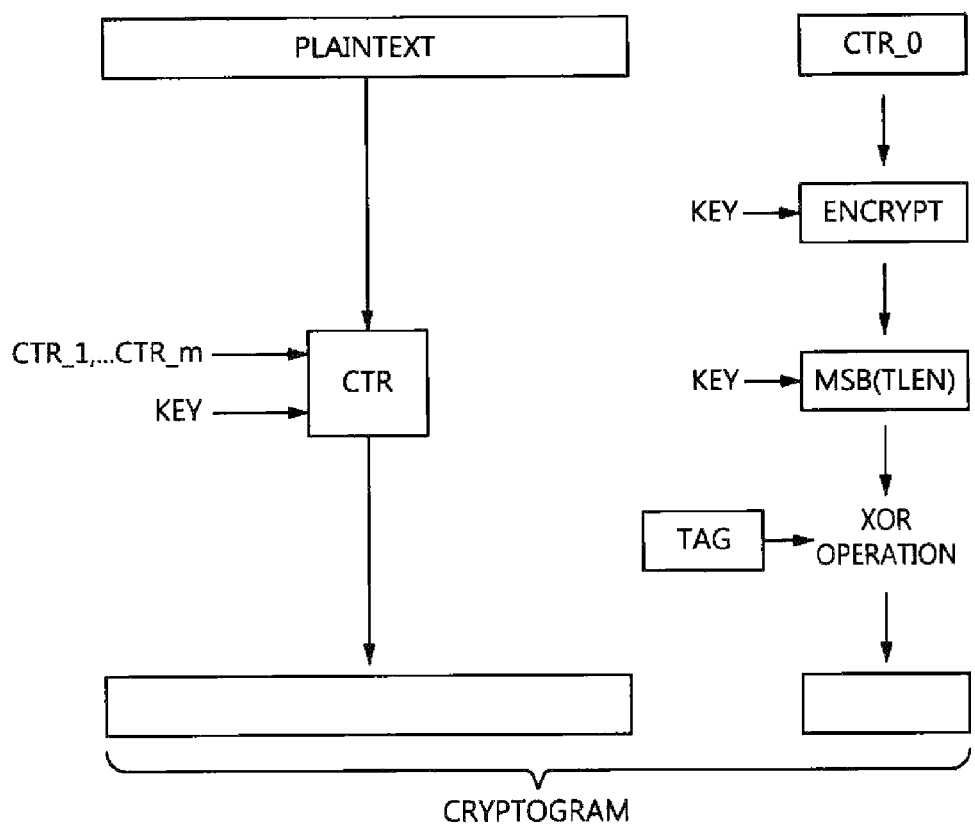
FIG. 8 is a diagram illustrating the encryption generation procedure of AES_CCM that is employed in the description of FIG. 7.

FIG. 7 is a flowchart illustrating a method of selectively applying a data encryption function according to a second embodiment of the present invention, and FIG. 8 is a diagram, illustrating the encryption generation procedure of AES_CCM that is employed in the description of FIG. 7.

First, the CoAP nodes 10 and 12 perform a DTLS handshake process using "TLS-PSK-WITH-AES-128-CCM-8," i.e., the basic DTLS encryption algorithm standard of the CoAP, in order to protect a CoAP message at step S10.

As described above, once the DTLS handshake process has been terminated, the CoAP client 10 and the CoAP server 12 have been prepared for the exchange of CoAP messages. That is, a DTLS security channel is set up between the CoAP client 10 and the CoAP server 12.

Thereafter, in the second embodiment of the present invention, both integrity and confidentiality functions are provided to a CoAP message. Accordingly, the CoAP client 10 generates a CoAP message that needs to be encrypted and sets the value of the lowest 1 bit of a CoAP option field to "1" indicating that encryption should be applied to the CoAP message at step S30. The setting of the value of the lowest 1 bit of the CoAP option field to "1" is described in detail later (see FIG. 9C).

Furthermore, the CoAP client 10 generates the authentication value of the CoAP message via a DTLS record layer protocol and performs an encryption process at step S32. For example, in the case of the encryption algorithm standard AES_CCM, the CoAP client 10 performs a process of generating an authentication value and an encryption generation procedure, such as those described with reference to FIG. 4. For example, in the case of AES_128_CBC_SHA256, the CoAP client 10 generates a cryptogram using AES and generates the authentication value using SHA256. In this case, whether the authentication value is generated first and then encryption is performed or whether encryption is performed first and then the authentication value is generated is selected in accordance with the DTLS encryption algorithm standard.

Thereafter, the CoAP client 10 sets the left highest 1 bit of the 2-byte "Epoch" field F of a DTLS record layer protocol header (see FIG. 6) to "1" via the DTLS record layer protocol at step S34.

Thereafter, the CoAP client 10 sends the encrypted CoAP message and the authentication value to the CoAP server 12 at step S36.

Accordingly, the CoAP server 12 checks the value of the left highest 1 bit of the 2-byte, "Epoch" field F of the DTLS record layer protocol header at step S38.

If, as a result of the checking, the value is found to be "1," the CoAP server 12 decodes the encrypted CoAP message, and verifies the authentication value at step S40.

As described above, the present embodiment of the present invention is characterized in that, as illustrated in FIG. 6, the left highest 1 bit of the 2-byte "Epoch" field F of the DTLS record layer protocol header is used as a bit that determines whether data confidentiality is provided.

Although the 1 bit of the "Epoch" field of the DTLS record layer protocol header is used in the embodiments of the present invention, part of another field other than the "Epoch" field may be defined and used. In some embodiments, part of a field defined in the TLS record layer protocol header may be defined and used.

Once a security negotiation is completed in accordance with the encryption algorithm standard that provides both data integrity and confidentiality in the DTLS handshake process via the above method, the DTLS record layer may use a mode in which only the integrity function is provided or a mode in which both integrity and confidentiality are provided.

Figure 9A:
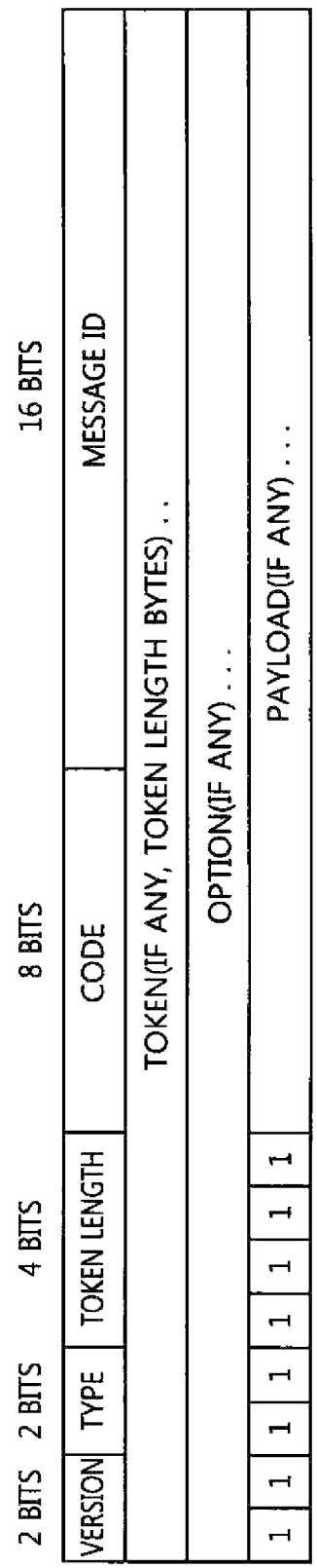
FIGS. 9A, 9B, and 9C are diagrams illustrating the CoAP option field that are employed in the first and second embodiments of the present invention.
Figure 9B:
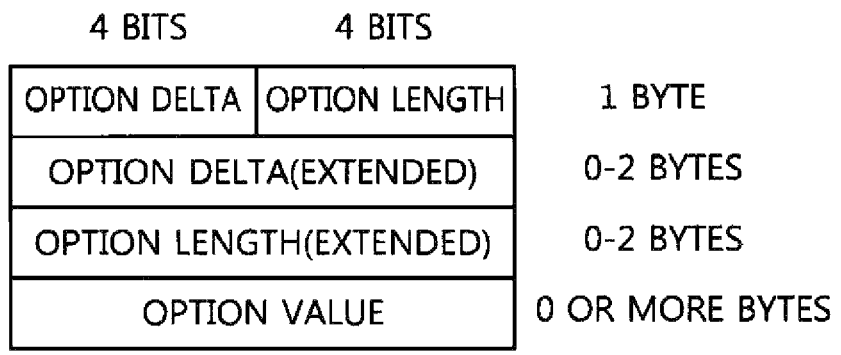
Figure 9C:
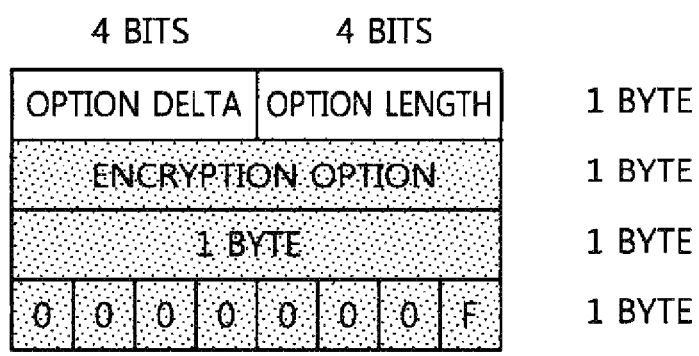

FIGS. 9A, 9B, and 9C are diagrams illustrating the CoAP option field that are employed in the first and second embodiments of the present invention. FIG. 9A illustrates the CoAP header format of an existing CoAP, FIG. 9B illustrates the CoAP option format of FIG. 9A, and FIG. 9C illustrates the CoAP option format of the CoAP proposed according to an embodiment of the present invention. FIGS. 9A and 9B may be viewed as illustrating comparative data indicating that the CoAP option format of the CoAP proposed by an embodiment of the present invention has been changed compared to the existing CoAP header format.

In an embodiment of the present invention, the DTLS record layer may selectively apply a confidentiality function to a CoAP message. For this purpose, the DTLS record layer needs to identify that encryption needs to be applied or not to be applied to a specific CoAP message.

For this purpose, in the present embodiment, as illustrated in FIG. 9C, a new option called "Encryption Option" is defined in the CoAP. That is, in the present embodiment, 1-byte Encryption Delta (Encryption Option) is newly defined instead of existing 0- to 2-byte Option Delta (Extended), an existing 0- to 2-byte Option Length (Extended) is defined as a 1-byte Option Length, and a 0- or more-byte existing Option Value is defined as a 1-byte Option Value "0000000F" in accordance with the CoAP option format.

In FIG. 9C, the right lowest 1 bit "F" of the Option Value is used to identify whether encryption has been applied to a CoAP message. That is, if the Option Value is "0," this corresponds to an encryption non-application mode. If the Option Value is "1," this corresponds to an encryption application mode. The DTLS record layer determines whether or not to apply encryption by checking the Option Value of a CoAP message. In an embodiment of the present invention, the CoAP option field has been defined in order to indicate whether encryption has been applied. In some embodiments, an HTTP message may be included in addition to a CoAP message, and a method of indicating whether encryption has been applied using a specific field and a specific option defined in each application protocol message format may be used.

As described above, in accordance with the embodiments of the present invention, CoAP nodes can set up a DTLS security channel using the DTLS encryption algorithm standard AES_CCM defined by default in the CoAP standard. The DTLS record layer can selectively apply an encryption function by taking into account the level of sensitivity according to the leakage of application data.

Furthermore, when IoT devices having limited resources provide only integrity or both integrity and confidentiality to a CoAP message using DTLS, they do not need to perform a separate DTLS handshake process. Furthermore, the DTLS encryption algorithm standard "TLS_PSK_WITH_NULL_SHA256" that provides only integrity does not need to be additionally implemented and installed on the IoT devices. Therefore, the resources of IoT devices can be efficiently used.

As described above, the optimum embodiments have been disclosed in the drawings and the specification. Although the specific terms have been used herein, they have been used merely for the purpose of describing the present invention, but have not been used to restrict their meanings or limit the scope of the present invention set forth in the claims. Accordingly, it will be understood by those having ordinary knowledge in the relevant technical field that various modifications and other equivalent embodiments can be made. Therefore, the true range of protection of the present invention should be defined based on the technical spirit of the attached claims.

What is claimed is:

1. A method of selectively applying a data encryption function, comprising:
    performing, by a Constrained Application Protocol (CoAP) client and a CoAP server, a datagram transport layer security (DTLS) handshake process;
    generating, by the CoAP client, a CoAP message when the DTLS handshake process has been completed, and then indicating, by the CoAP client, that encryption does not need to be applied to the CoAP message;
    generating, by the CoAP client, only an authentication value of the CoAP message via a DTLS record layer protocol;
    setting, by the CoAP client, a value of a specific field of a DTLS record layer protocol header to a specific value via the DTLS record layer protocol; and
    sending, by the CoAP client, the CoAP message and the authentication value to the CoAP server,
    wherein the specific field of the DTLS record layer protocol header comprises an epoch field, and
    wherein the setting the value of the specific field of the DTLS record layer protocol header to the specific value comprises setting a left highest 1 bit of the epoch field to 0.

2. The method of claim 1, wherein the performing the DTLS handshake process comprises performing the DTLS handshake process in accordance with an encryption algorithm standard that provides both data integrity and confidentiality.

3. The method of claim 1, wherein the indicating that the encryption does not need to be applied to the CoAP message comprises setting a value of a lowest 1 bit of a CoAP option field to 0.

4. The method of claim 1, wherein the indicating that the encryption does not need to be applied to the CoAP message comprises:
    newly defining an Encryption Option in a CoAP; and
    setting a right lowest 1 bit of an option value region of a CoAP format to 0.

5. The method of claim 1, further comprising, after sending the CoAP message and the authentication value to the CoAP server,
    checking, by the CoAP server, the value of the specific field of the DTLS record layer protocol header; and
    verifying, by the CoAP server, only the authentication value of the CoAP message if, as a result of the checking, the value of the specific field is found to be the specific value.

6. The method of claim 5, wherein the checking the value of the specific field of the DTLS record layer protocol header comprises checking a value of a left highest 1 bit of an epoch field of the DTLS record layer protocol header.

7. The method of claim 6, wherein the verifying only the authentication value of the CoAP message if, as a result of the checking, the value of the specific field is found to be the specific value comprises verifying only the authentication value of the CoAP message if the value of the left highest 1 bit of the epoch field of the DTLS record layer protocol header is 0.

8. A method of selectively applying a data encryption function, comprising:
  performing, by a Constrained Application Protocol (CoAP) client and a CoAP server, a datagram transport layer security (DTLS) handshake process;
  generating, by the CoAP client, a CoAP message when the DTLS handshake process has been completed, and then indicating, by the CoAP client, that encryption needs to be applied to the CoAP message;
  generating, by the CoAP client, an authentication value of the CoAP message, and performing, by the CoAP client, encryption via a DTLS record layer protocol;
  setting, by the CoAP client, a value of a specific field of a DTLS record layer protocol header to a specific value via the DTLS record layer protocol; and
  sending, by the CoAP client, the encrypted CoAP message and the authentication value to the CoAP server,
  wherein the specific field of the DTLS record layer protocol header comprises an epoch field, and
  wherein the setting the value of the specific field of the DTLS record layer protocol header to the specific value comprises setting a left highest 1 bit of the epoch field to 1.

9. The method of claim 8, wherein the performing the DTLS handshake process comprises performing the DTLS handshake process in accordance with an encryption algorithm standard that provides both data integrity and confidentiality.

10. The method of claim 8, wherein the indicating that the encryption needs to be applied to the CoAP message comprises setting a value of a lowest 1 bit of a CoAP option field to 1.

11. The method of claim 8, wherein the indicating that the encryption needs to be applied to the CoAP message comprises:
  newly defining an Encryption Option in a CoAP; and
  setting a right lowest 1 bit of an option value region of a CoAP format to 1.

12. The method of claim 8, further comprising, after sending the encrypted CoAP message and the authentication value to the CoAP server:
  checking, by the CoAP server, the value of the specific field of the DTLS record layer protocol header; and
  decoding, by the CoAP server, the encrypted CoAP message, and then verifying, by the CoAP server, the authentication value if, as a result of the checking, the value of the specific field is found to be the specific value.

13. The method of claim 12, wherein the checking the value of the specific field of the DTLS record layer protocol header comprises checking a left value of a highest 1 bit of an epoch field of the DTLS record layer protocol header.

14. The method of claim 13, wherein the decoding the encrypted CoAP message and the verifying the authentication value if, as a result of the checking, the value of the specific field is found to be the specific value comprises decoding the encrypted CoAP message and also verifying the authentication value if the value of the left highest 1 bit of the epoch field of the DTLS record layer protocol header is 1.

* * * * *